UNITED STATES PATENT OFFICE 2,030,055

NONSLIPPERY FLOOR WAX

Tod G. Dixon, Brooklyn, N. Y.

No Drawing. Application January 27, 1934,
Serial No. 708,696

5 Claims. (Cl. 134—24)

This invention relates to non-slippery floor waxes; and it comprises a composition for waxing floors having the usual wax components and solvents and plasticizers therefor and also containing a small proportion of rubber (caoutchouc); the amount of rubber being sufficient to give a substantially greater coefficient of friction to the waxed floor without substantial change in other properties; all as more fully hereinafter set forth and as claimed.

Commercial floor waxes are fluent compositions either liquid or pasty at atmospheric temperature containing various waxes and enough solvent or liquid to give the consistency desired. After application to a floor and exposure to air, the composition hardens and the characteristic waxiness, which is what is wanted, is developed. The number of waxes giving satisfactory compositions is not great. Beeswax, carnauba wax, ceresin, paraffin, etc. are in common use in various admixtures. Various plasticizers are often added in minor amount to modify the properties of the wax somewhat. Spirits of turpentine and similar non-aqueous liquids are generally employed in "cutting" the wax and giving commercial floor wax compositions the necessary consistency for convenient application. In any event, after application to a floor the liquid evaporates and leaves the wax as a hard continuous film capable of taking a polish. The requirements on this film are rather exacting and really satisfactory commercial preparations not many. The film of wax left on a waxed floor must have a hard lustrous surface taking a polish and not marring with use; by shifting furniture, walking, etc. Polishability and hardness are important properties. The coating must also be light-colored and transparent enough to show the color and grain of the varnished wood underneath. In securing these results the coating must be substantially all wax. Plasticizers and compounding ingredients usual in other coating compositions are not permissible in floor waxes in any amount sufficient to interfere with the characteristic waxiness.

An inherent defect of all these wax compositions, however, is slipperiness; a wax coating satisfactory in all other respects is more or less slippery. Some of the waxes give coatings more slippery than others; slipperiness being least with beeswax and greatest with compositions containing paraffin. But all waxed floors produced with commercial floor waxes are, more or less, slippery. Sometimes a certain amount of slipperiness is desirable; sometimes it is not. In the household slipperiness is often a source of personal risk and of annoyance.

It is a desideratum in the art to provide a floor wax having all the other desirable properties but with a higher coefficient of friction. Such a wax I provide in the present invention. I improve on the old types of commercial floor waxes by incorporating a modicum of rubber in the composition; the amount not being sufficient to impair the characteristic waxy properties of the composition but being sufficient to obviate undue slipperiness. In other words, I give a higher coefficient of friction to the composition with the aid of rubber. My invention may be utilized either with the non-aqueous type of commercial floor wax, having the wax cut with turpentine or other non-aqueous solvent, or with the aqueous emulsion type; a liquid or pasty composition containing emulsified wax. In the former case light-colored, good quality raw rubber is cut with turpentine or another non-aqueous solvent and added to the composition. In the latter, rubber is added to the composition in the form of commercial latex; an aqueous dispersion of rubber. Usually, this is the natural latex stabilized with a little ammonia, but I can also use various artificial aqueous dispersions of the same character. In all cases, however, the rubber should be light-colored.

In an embodiment of the present invention using carnauba wax and beeswax as the basic wax components, the carnauba wax is melted in any convenient apparatus and is then mixed with 10 per cent or so of beeswax. Beeswax is desirable in these wax compositions but is unduly expensive. However, it is desirable to have some beeswax in admixture with the carnauba wax. To this mixture is added enough turpentine to give the final product a liquid or pasty consistence; whichever may be desired. So far, this is an ordinary floor wax composition. To it I next add high grade light-colored raw rubber cut with turpentine, using, ordinarily, 15 or 20 parts of spirits of turpentine for each part of rubber. After incorporating rubber and turpentine together, the mixture is allowed to stand for some hours. For every hundred parts of the mixed waxes, I add enough of the turpentine-rubber composition to give about 10 parts rubber. In admixing, it is advantageous to first heat the turpentine-wax mixture to a rather high temperature; say, about 180° C., and add the rubber-turpentine mixture hot. Heating and stirring should be continued until the mass becomes homogeneous. It may then be cooled and used, being applied to a floor in the same way as any other floor wax. I find that in these floor wax compositions the stated addition of about 10 per cent rubber on the wax gives the best results; a floor wax containing this amount of added rubber acquires a coefficient of friction making it safe in the household but without forfeiting the advantageous wax properties. A greater coefficient of friction, or a less, can be attained by increasing or decreasing the proportion of rubber. Either may be desired for special purposes.

A pasty composition made as just described is readily applied to a floor in the usual way and on exposure to the air after a time gives a coating of high hardness and permanence capable of taking a high polish. It differs from similar compositions however in the qualities imparted by the rubber; the foot does not slip, rugs do not shift under the foot, etc. The composition is light-colored, is semi-transparent and is not marred by ordinary furniture movement or by walking. Rugs and carpets stay in place under the foot.

The spirits of turpentine used in the composition can be replaced by equivalent solvents or mixtures of solvents. The mineral oil distillate known as turpentine substitute is particularly useful. Benzol, toluol, xylol and other coal tar oils and mixtures may be used. In lieu of the specific mixture of beeswax and carnauba wax stated, other proportions may be used and other waxes, such as paraffin wax, candelila wax, ceresin, etc., may be employed. For dark-colored compositions, montan wax may be used. Gum turpentine or gum thus is often a useful addition. Various resins, such as shellac, may be employed in small amounts; amounts which do not detract from the waxiness of the final composition.

The present wax may be applied not only to wood floors but to other floor materials, such as linoleum, terraza, etc.

Many compositions may be made within the present invention, using ordinary types of floor wax and imparting a certain increase in the coefficient of friction by the incorporation of a limited amount of rubber. But the floor wax composition stated in the specific embodiment given above is typical of the products produced under this invention.

In certain comparative tests made to show the difference between the frictional qualities of wax under the present invention and similar wax compositions without the rubber addition, waxed oak was used. In each test an inclined plane and a block were used, the angle of the plane being changed until the block would just slip down. Both the block and the plane were oak and each was waxed with the same wax composition prior to each test; each being coated with a wax composition allowed to dry in place 30 minutes. The waxed surfaces were then polished with a dry rag and allowed to stand 10 minutes more. After this they were repolished and the test made. As stated, in each test the angle was determined at which the block would just slip down under its own weight. Calling the tangent of this angle the coefficient of friction C, it was found that with a wax made as particularly described ante, C equalled 0.460, while exactly the same composition but without the rubber gave C equalling 0.146. This latter value is of the same order as that of most of the commercial floor waxes. One such commercial composition tested gave C equalling 0.135. In these tests the values are for friction between waxed wood and waxed wood. For practical purposes, however, the coefficient of friction of sole leather on the waxed surface is more important. Repeating the tests with a moving unwaxed leather surface instead of a block of waxed wood, it was found that with my composition C had a value of 0.68, while the same composition without the rubber had a value of 0.33. This is also the value given by this test on many commercial floor waxes.

As stated, the present invention is also applicable to aqueous suspensions of wax; to commercial floor waxes containing wax dispersed in an aqueous vehicle. In an embodiment of the present invention making a floor wax of the emulsion type, carnauba wax is melted and a small amount of oleic acid added as a softening and acidifying agent. A little triethanolamine is added to form a soap acting as an emulsifying agent later. Further saponification is effected by an addition of a little borax or potassium carbonate, the whole being stirred and heated to a temperature between 90° and 100° C. Water is added with constant stirring and heating until a good emulsion is formed of the consistency later desired. It is often desirable to add a very small amount of a shellac solution; a solution of shellac made with water containing a little ammonia. After the emulsion is formed latex or a similar aqueous dispersion of rubber is added in an amount giving about 10 per cent rubber on the wax. As before, it is useful to add some beeswax to the carnauba wax; say, 10 per cent or so.

An emulsion made as just described can be applied to the floor in the usual way and on drying and polishing will give a high grade waxed surface having the desired translucency, lustre, light color, etc., but having a high coefficient of friction. The coefficient of friction may be made the same as in the non-aqueous floor wax described ante.

What I claim is:

1. An improved floor wax composition for use in waxing floors yielding polished coatings having an increased coefficient of friction, said composition having a liquid to pasty consistency and comprising a blended mixture of carnauba wax with about 10 per cent beeswax, and rubber dissolved in turpentine, the ratio of wax to rubber being about 100:10 and the amount of turpentine being sufficient to produce the required consistency and the amount of rubber being sufficient to greatly increase the coefficient of friction of the polished coating without altering the finish thereof.

2. In the manufacture of improved floor wax compositions, the process which comprises melting carnauba wax, adding about 10 per cent beeswax to the molten carnauba wax, adding sufficient turpentine to the wax mixture to produce a pasty floor wax, separately forming a turpentine solution of rubber containing about one part of rubber dissolved in between 15 and 20 parts of turpentine, then heating the pasty turpentine wax mixture to about 180° C., adding the turpentine-rubber solution with agitation to the hot turpentine-wax mixture and continuing the heating and agitation until a homogeneous improved floor wax composition is obtained and finally cooling the composition so obtained, said improved floor wax composition having a liquid to pasty consistency and yielding wax coatings having a high polish and an increased coefficient of friction.

3. As an improved floor wax, a wax composition having a liquid to pasty consistency, said composition comprising about 90 parts of carnauba wax, 10 parts of beeswax and 10 parts of rubber, said materials being blended together and thinned with sufficient volatile organic solvent to give said consistency.

4. The product of claim 3 wherein said solvent is turpentine.

5. In the production of polishable wax coatings on floors and woodwork the improvement which comprises applying to the surface thereof a fluent wax composition containing the usual ingredients of floor waxes and containing in addition thereto a minor proportion of incorporated rubber, the amount being insufficient to impair any property of the wax as a floor wax, including its waxiness, polishability and pore filling characteristics but being sufficient to impart a substantially increased coefficient of friction to the waxed surface.

TOD G. DIXON.